(12) United States Patent
Konishi et al.

(10) Patent No.: US 6,993,993 B2
(45) Date of Patent: Feb. 7, 2006

(54) SHEET METAL OUTSERT-MOLDED GEAR

(75) Inventors: Akio Konishi, Sanda (JP); Koichiro Hirabayashi, Hirakata (JP); Kazuo Shibukawa, Ibaraki (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 10/152,511

(22) Filed: May 21, 2002

(65) Prior Publication Data

US 2002/0178853 A1 Dec. 5, 2002

(30) Foreign Application Priority Data

May 29, 2001 (JP) ............................. 2001-160303

(51) Int. Cl.
*F16H 55/00* (2006.01)
(52) U.S. Cl. ............... 74/446; 74/449; 74/DIG. 10
(58) Field of Classification Search ............ 74/439, 74/446, 448, 449, DIG. 10
See application file for complete search history.

(56) References Cited

U.S. PATENT DOCUMENTS

| | | | | |
|---|---|---|---|---|
| 1,771,370 A | * | 7/1930 | Benge | 74/449 |
| 3,530,735 A | * | 9/1970 | Allen | 74/446 |
| 4,589,860 A | * | 5/1986 | Brandenstein et al. | 74/446 |
| 4,946,427 A | * | 8/1990 | Rampe | 474/161 |
| 5,722,295 A | * | 3/1998 | Sakai et al. | 74/443 |
| 6,622,814 B2 | * | 9/2003 | Kurokawa et al. | 180/444 |

FOREIGN PATENT DOCUMENTS

| | | | |
|---|---|---|---|
| JP | 57-103965 | * | 6/1982 |
| JP | 64-11810 | * | 1/1989 |
| JP | 3-277859 | * | 12/1991 |

* cited by examiner

*Primary Examiner*—William C. Joyce
(74) *Attorney, Agent, or Firm*—Renner,Otto,Boisselle & Sklar, LLP

(57) ABSTRACT

A sheet metal outsert-molded gear, in which a molded resin gear is formed by outsert-molding along the outer perimeter of a disk-shaped sheet metal, characterized in that one or more notches, holes, or protrusions are provided in the outer perimeter of the disk-shaped sheet metal.

3 Claims, 5 Drawing Sheets

SHEET METAL OUTSERT-MOLDED GEAR

BACKGROUND OF THE INVENTION

1. Field of the Invention

The present invention relates to a sheet metal outsert-molded gear for use in a video tape recorder, an audio tape recorder, etc.

2. Description of the Related Art

Hereinafter, a structure of a conventional sheet metal outsert-molded gear is described.

FIG. 5 is a plan view of a conventional sheet metal outsert-molded gear 50. FIG. 6 is a cross-sectional view of the conventional sheet metal outsert-molded gear 50 taken along line B—B of FIG. 5. In FIGS. 5 and 6, reference numeral 1 denotes a disk-shaped sheet metal member. Reference numeral 2 denotes a molded resin gear, which is formed by outsert-molding along the outer perimeter of the disk-shaped sheet metal member 1. In use of the sheet metal outsert-molded gear 50, the molded resin gear 2 is engaged with an external gear (not shown), and is rotated by or transmits rotation to the external gear. Reference numeral 3 denotes a bearing section, which is formed by outsert-molding along the inner perimeter of the disk-shaped sheet metal member 1. Reference numerals 4a, 4b, and 4c denote positions of gates formed in a mold, through which resin is injected for forming the molded resin gear 2 by injection molding (hereinafter, simply referred to as "gate positions"). Reference numerals 5a, 5b, and 5c denote welds, which are interfaces between the resin materials injected from the gate positions 4a, 4b, and 4c. In general, a weld occurs in each intermediate region between the gate positions 4a, 4b, and 4c (e.g., half way between each of the gate positions 4a, 4b, and 4c). In the conventional example illustrated in FIG. 5, a gate position(s) corresponding to a gate(s) of the mold which is used for forming the bearing section 3 by injection molding is omitted.

The dashed lines in FIG. 5 denote the portions of the disk-shaped sheet metal member 1 which lie within the bearing section 3 and molded resin gear 2, as shown in FIG. 6.

Variation in the state of the sheet metal outsert-molded gear 50 with the passage of time (i.e., through use of the sheet metal outsert-molded gear 50 with an external gear as described above) is now described.

FIG. 7 is a plan view showing a fatigued state of the conventional sheet metal outsert-molded gear 50 after use. Reference numeral 6 denotes a weld crack, which is caused at the weld 5a of FIG. 5 due to a variation of the resin material of the molded resin gear 2 with the passage of time through use thereof. That is, the resin material is deformed from an initial state when the molded resin gear 2 is first produced.

In the conventional sheet metal outsert-molded gear 50 having the weld crack 6 in such a fatigued state, an interval between gear teeth 7a and 7b (gear pitch 8) is greater than that of the normal state, i.e., the gear pitch 8 is more than the initial gear pitch when the conventional sheet metal outsert-molded gear 50 is first formed. Thus, the molded resin gear 2 cannot be successfully engaged with the external gear, and accordingly, the rotation of the molded resin gear 2 in association with the external gear is not facilitated. As such, the functional operation of the conventional sheet metal outsert-molded gear 50 is not realized with prolonged use. The present invention provides solutions to such problems of the conventional sheet metal outsert-molded gear.

SUMMARY OF THE INVENTION

According to one aspect of the present invention, there is provided a sheet metal outsert-molded gear, in which a molded resin gear is formed by outsert-molding along the outer perimeter of a disk-shaped sheet metal, characterized in that one or more notches, holes, or protrusions are provided in the outer perimeter of the disk-shaped sheet metal.

In one embodiment of the present invention, one or more notches, holes, or protrusions are provided at positions opposite to gate positions on the molded resin gear, or at intermediate positions between adjacent gate positions on the molded resin gear, in the outer perimeter of the disk-shaped sheet metal.

In another embodiment of the present invention, the protrusions are provided in teeth of the molded resin gear.

In still another embodiment of the present invention, the notches or the holes are provided at interfaces between portions of the resin material forming the molded resin gear.

In still another embodiment of the present invention, the notches, the holes, or the protrusions are provided at both sides of an interface between portions of the resin material forming the molded resin gear.

According to the present invention, in a sheet metal outsert-molded gear, at least one notch, hole, or protrusion is provided in the outer perimeter of a disk-shaped sheet metal member. With such an arrangement, even if a weld crack occurs, gear pitch is substantially maintained, and as such rotation of the sheet metal outsert-molded gear in connection with an external gear is also maintained.

According to the present invention, at least one notch, hole, or protrusion as an engagement portion (described below) is provided in the outer perimeter of the disk-shaped sheet metal member at a position opposite to a gate position on the molded resin gear with respect to the center of the disk-shaped sheet metal member, or at an intermediate position between gate positions on the molded resin gear. In such an arrangement, an engagement portion for engaging the disk-shaped sheet metal member with the molded resin gear is located at a position opposite to a gate position on the molded resin gear with respect to the center of the disk-shaped sheet metal member, or at an intermediate position between the gate positions on the molded resin gear, where a weld is most likely to occur. Due to such a structure, even if a weld crack occurs, the gear pitch is substantially maintained since the disk-shaped sheet metal member and the molded resin gear remain engaged. Thus,rotation of the sheet metal outsert-molded gear in accordance with the rotation of an external gear is also maintained.

Thus, the invention described herein makes possible the advantages of providing a sheet metal outsert-molded gear in which, even if a weld crack occurs, a gear pitch does not change, and rotation of the sheet metal outsert-molded gear is maintained.

These and other advantages of the present invention will become apparent to those skilled in the art upon reading and understanding the following detailed description with reference to the accompanying figures.

DESCRIPTION OF THE PREFERRED EMBODIMENTS

Hereinafter, embodiments of the present invention will be described with reference to FIGS. 1 through 4.

(Embodiment 1)

Figure 1:
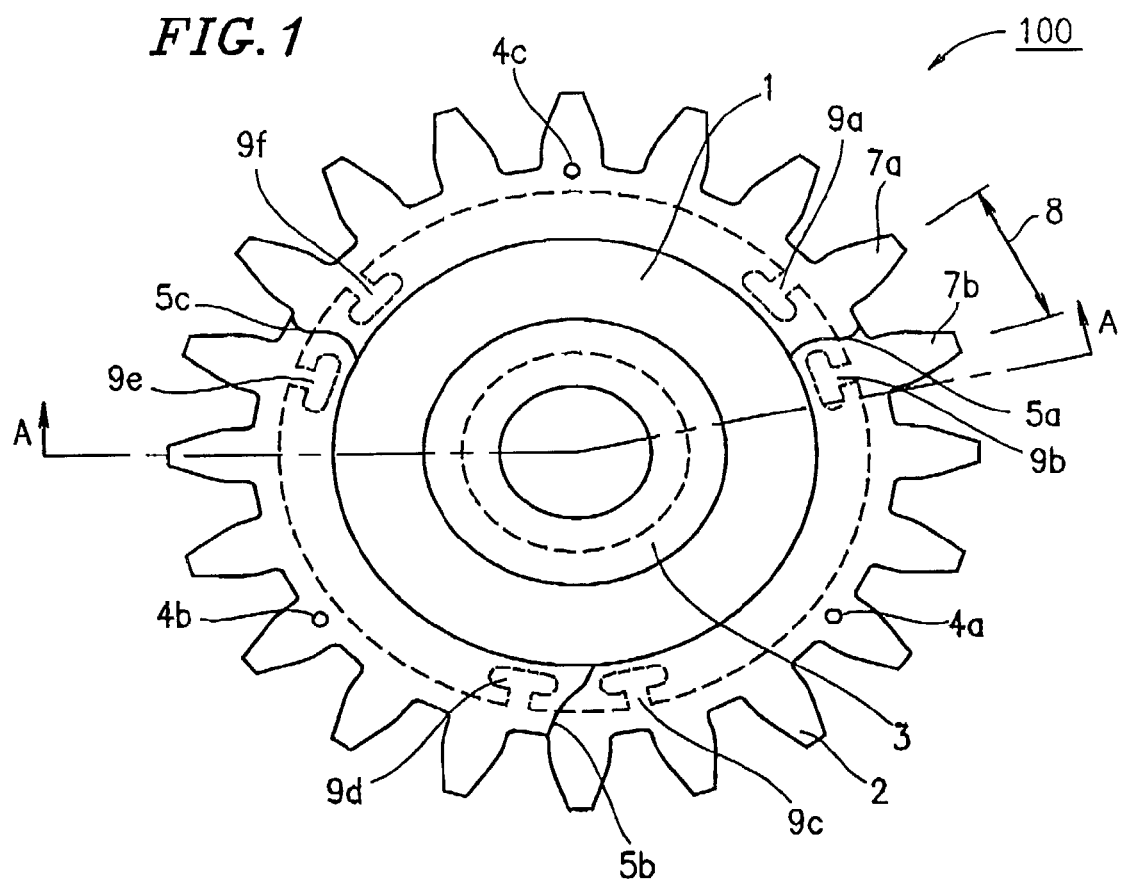
FIG. 1 is a plan view of a sheet metal outsert-molded gear according to embodiment 1 of the present invention.
Figure 2:
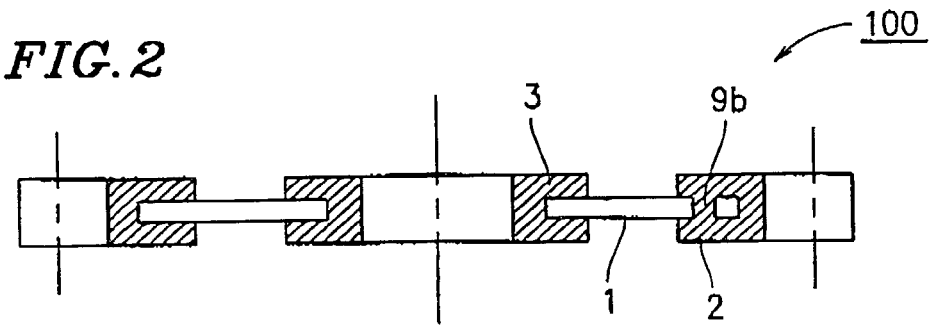
FIG. 2 is a cross-sectional view of the sheet metal outsert-molded gear of embodiment 1 taken along line A—A of FIG. 1.

FIG. 1 is a plan view of a sheet metal outsert-molded gear 100. FIG. 2 is across-sectional view of the sheet metal outsert-molded gear 100 taken along line A—A of FIG. 1. In FIGS. 1 and 2, like elements (having the same names and same functions) are indicated by like reference numerals used in FIGS. 5 and 6.

In FIGS. 1 and 2, reference numeral 1 denotes a disk-shaped sheet metal member. Reference numeral 2 denotes a molded resin gear, which is formed by outsert-molding along the outer perimeter of the disk-shaped sheet metal member 1. In use of the sheet metal outsert-molded gear 100, the molded resin gear 2 is engaged with an external gear (not shown), and is rotated by or transmits rotation to the external gear. Reference numeral 3 denotes a bearing section, which is formed by outsert-molding along the inner perimeter of the disk-shaped sheet metal member 1. Reference numerals 4a, 4b, and 4c denote gate positions corresponding to gates formed in a mold, through which resin is injected for forming the molded resin gear 2 by injection molding. Reference numerals 5a, 5b, and 5c denote welds, which are interfaces between the resin materials injected from the gate positions 4a, 4b, and 4a.

In the example illustrated in FIG. 1, a gate position corresponding to a gate of the mold used for forming the bearing section 3 by injection molding is omitted. The dashed lines in FIG. 1 denote the portions of the disk-shaped sheet metal member 1 which lie within the bearing section 3 and molded resin gear 2, as shown in FIG. 2.

Further, in FIG. 1, reference numerals 9a, 9b, 9c, 9d, 9e, and 9f denote notches as engagement portions formed in the outer perimeter of the disk-shaped sheet metal member 1. A pair of notches is provided in each intermediate region between the gate positions 4a, 4b, and 4c. For example, either at positions opposite to the gate positions 4a, 4b, and 4c with respect to the center of the disk-shaped sheet metal member 1 or at intermediate positions between adjacent ones of the gate positions 4a, 4b, and 4a. Specifically, the pair of notches can be located on opposite side of a weld. Because of the notches 9a, 9b, 9c, 9d, 9e, and 9f, the disk-shaped sheet metal member 1 and the molded resin gear 2 are integrally engaged with each other.

Figure 5:
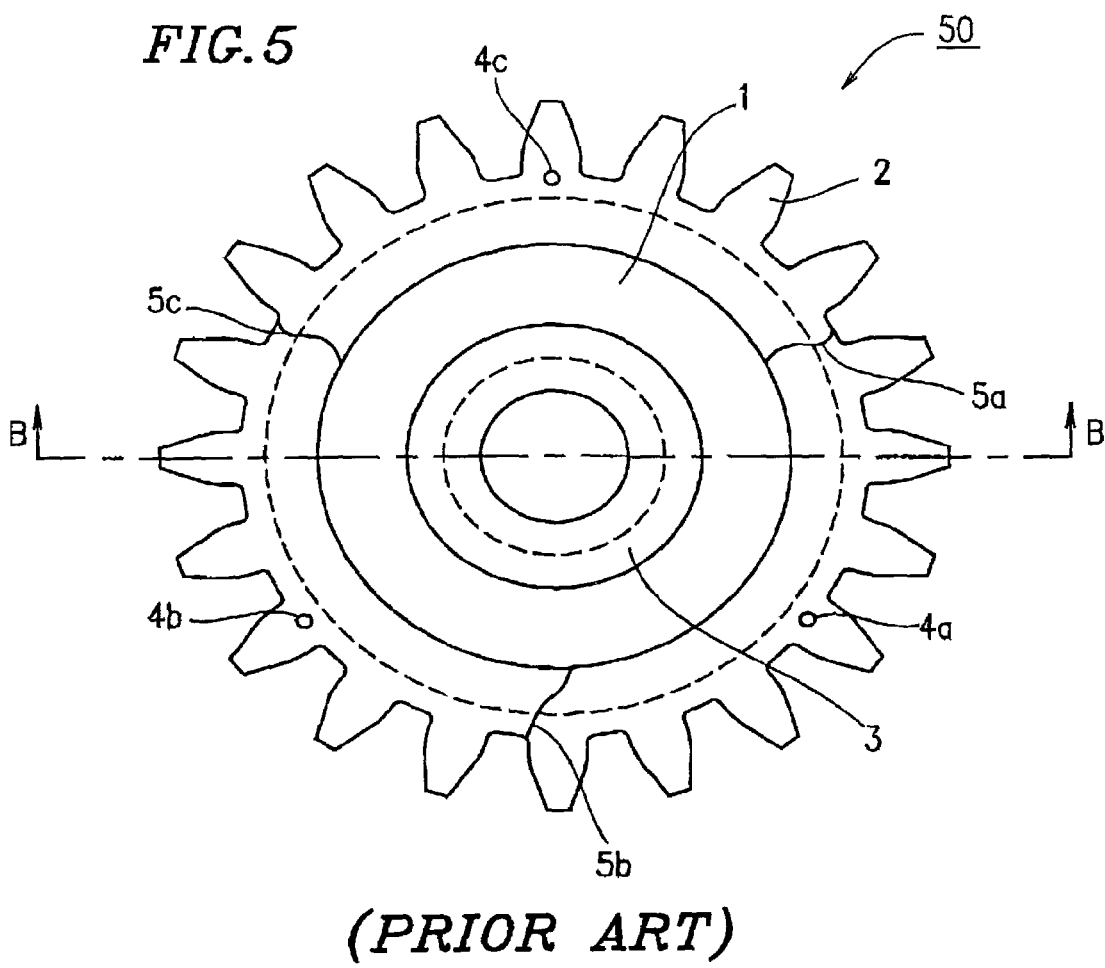
FIG. 5 is a plan view of a conventional sheet metal outsert-molded gear.
Figure 6:
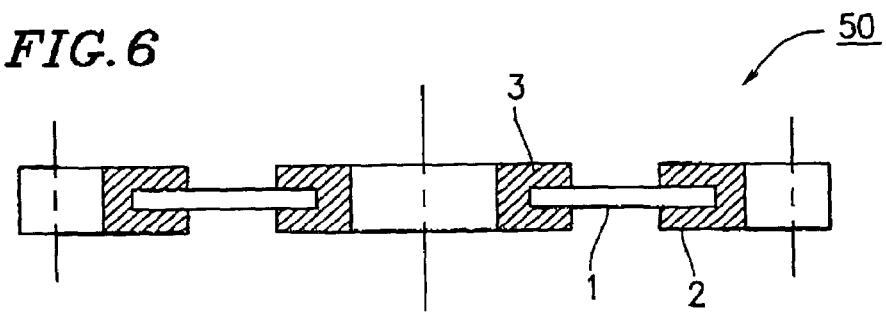
FIG. 6 is a cross-sectional view of the conventional sheet metal outsert-molded gear taken along line B—B of FIG. 5.
Figure 7:
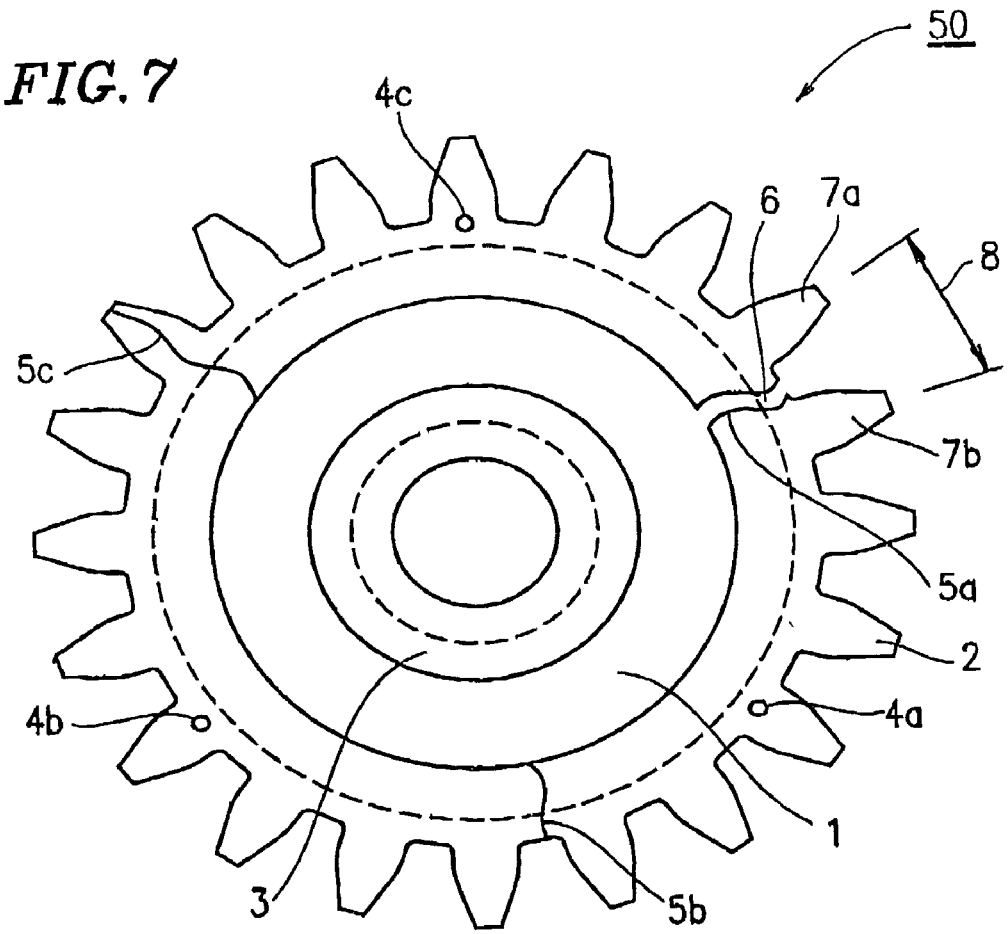
FIG. 7 is a plan view showing the conventional sheet metal outsert-molded gear after a certain length of time has elapsed.

That is, unlike the conventional sheet metal outsert-molded gear 50 shown in FIG. 5, the disk-shaped sheet metal member 1 and molded resin gear 2 of the sheet metal outsert-molded gear 100 according to embodiment 1 of the present invention are held together in relative positional relationship due to the contact of the molded resin gear 2 interior with the notches 9a–9f of the disk-shaped sheet metal member 1. More specifically, the notches 9a–9f act as engagement portions which hold the molded resin gear 2 in place relative to the disk-shaped sheet metal member 1, whereas in the conventional sheet metal outsert-molded gear 50, the resin material of the molded resin gear is free to move relative to the disk-shaped sheet metal member.

The gear pitch 8 shown in FIG. 1 is an interval between the gear teeth 7a and 7b of the molded resin gear 2.

Thus, according to embodiment 1, the disk-shaped sheet metal member 1 and the molded resin gear 2 are integrally engaged with each other by the engagement portions formed by the notches 9a, 9b, 9c, 9d, 9e, and 9f. Even if a crack is caused at the weld 5a, for example, due to a variation (i.e., deformation) of the resin material of the molded resin gear 2 with the passage of time through use of the sheet metal outsert-molded gear 100, the relative position of the gear teeth 7a and 7b is hot substantially changed with respect to the disk-shaped sheet metal member 1. Thus, the gear pitch 8 is substantially maintained, and rotation of the sheet metal outsert-molded gear 100 in association with the external gear is also maintained. In embodiment 1, the notches 9a, 9b, 9c, 9d, 9e, and 9f are provided in the intermediate regions between the gate positions 4a, 4b, and 4c, i.e., engagement portions for engaging the disk-shaped sheet metal member land the molded resin gear 2 are provided at location in the vicinity of where a weld is most likely to occur. Thus, even if a weld crack occurs, the gear pitch 8 is substantially maintained, and thus rotation of the sheet metal outsert-molded gear 100 in accordance with the rotation of the external gear is also maintained.

(Embodiment 2)

Figure 3:
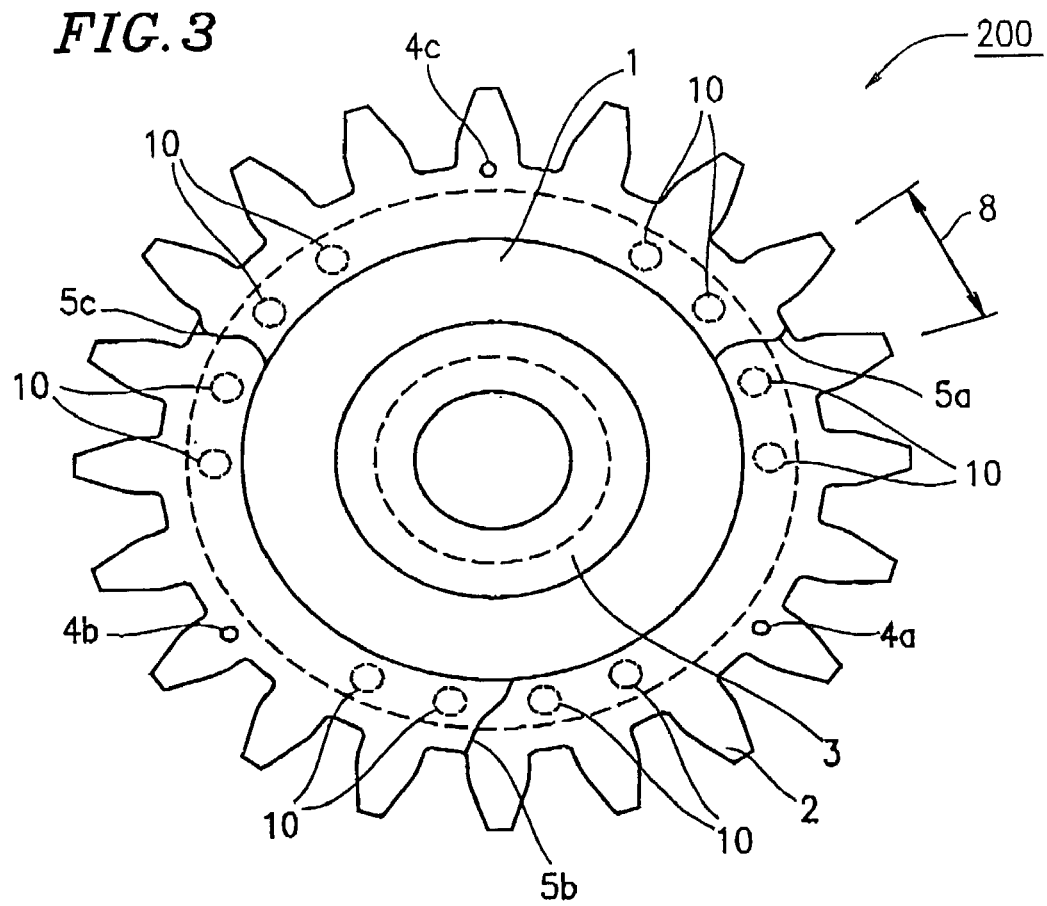
FIG. 3 is a plan view of a sheet metal outsert-molded gear according to embodiment 2 of the present invention.

FIG. 3 is a plan view of a sheet metal outsert-molded gear 300. In FIG. 3, like elements (having the same names and same functions) are indicated by like reference numerals used in FIG. 1, and the descriptions thereof are herein omitted. Reference numeral 10 denotes holes as engagement portions formed in the outer perimeter of the disk-shaped sheet metal member 1. Four holes are provided in each intermediate region between the gate positions 4a, 4b, and 4c. Because of the holes 10, the disk-shaped sheet metal member 1 and the molded resin gear 2 are integrally engaged with each other in similar fashion to the notches 9a–9f of embodiment 1.

Thus, according to embodiment 2, even if a crack is caused at the weld 5a, for example, due to a variation of the resin material of the molded resin gear 2 with the passage of time, the gear pitch 8 is substantially maintained because the disk-shaped sheet metal member 1 and the molded resin gear 2 are integrally engaged with each other through the action of the holes 10 allowing the resin material of the molded resin gear 2 to be located within the holes 10 of the disk-shaped sheet metal member 1. Thus, rotation of the sheet metal outsert-molded gear 200 in association with the external gear is also maintained.

(Embodiment 3)

Figure 4:
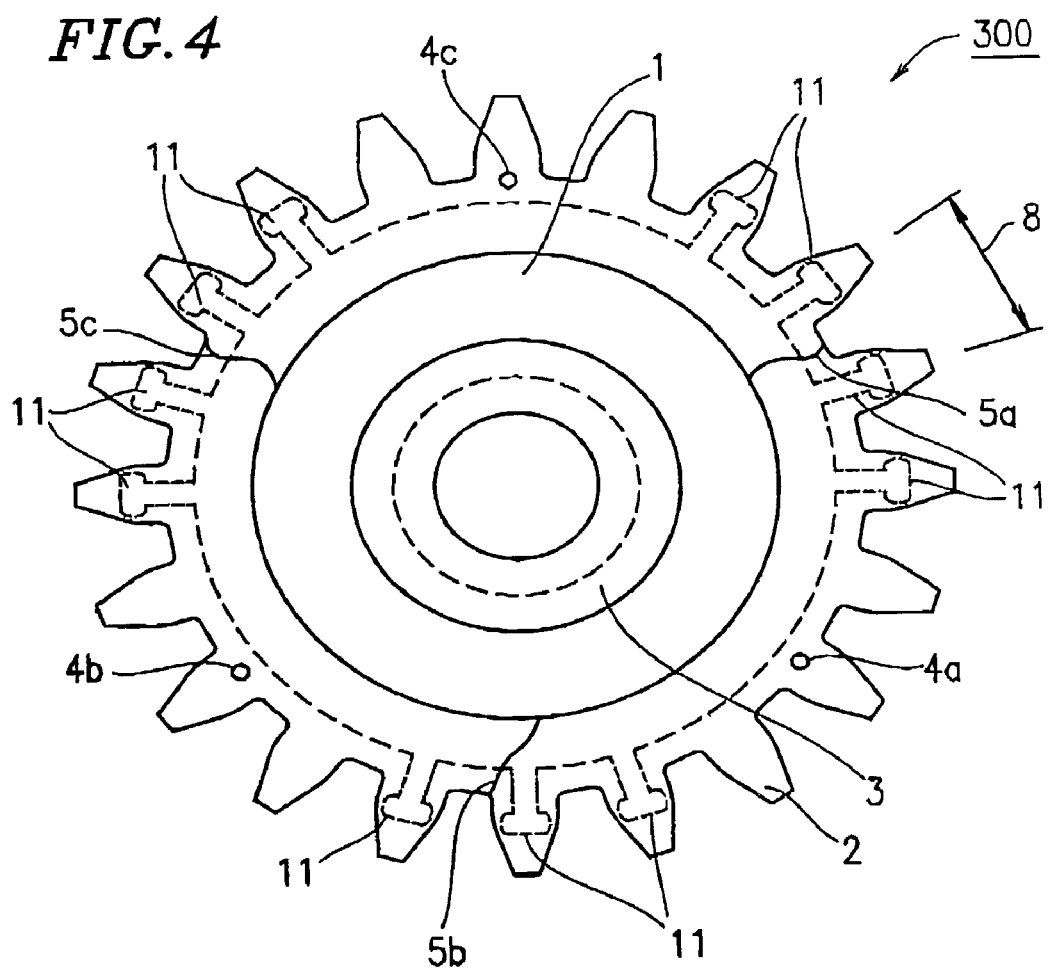
FIG. 4 is a plan view of a sheet metal outsert-molded gear according to embodiment 3 of the present invention.

FIG. 4 is a plan view of a sheet metal outsert-molded gear 300. In FIG. 4, like elements (having the same names and same functions) are indicated by like reference numerals used in FIG. 1, and the descriptions thereof are herein omitted. Reference numeral 11 denotes protrusions as engagement portions formed in the outer perimeter of the disk-shaped sheet metal member 1. Three or four protrusions are provided in the intermediate regions between the gate positions 4a, 4b, and 4c. Because of the protrusions 11, the disk-shaped sheet metal member 1 and the molded resin gear 2 are integrally engaged with each other in similar fashion to the notches 9a–9f of embodiment 1 and the holes 10 of embodiment 2. Herein, the protrusions may be provided within the molded resin gear 2.

Thus, according to embodiment 3, even if a crack is caused at the weld 5a, for example, due to a variation of the resin material of the molded resin gear 2 with the passage of time, the gear pitch 8 is substantially maintained because the disk-shaped sheet metal member 1 and the molded resin gear 2 are integrally engaged with each other by the protrusions 11. Thus, rotation of the sheet metal outsert-molded gear 300 in association with the external gear is also maintained.

Furthermore, since the protrusions 11 extend into the respective gear teeth of the molded resin gear 2, the engagement between the disk-shaped sheet metal member 1 and the molded resin gear 2 is increased over embodiments 1 and 2.

According to embodiments 1–3, the notches, holes, or protrusions are provided in the outer perimeter of the disk-shaped sheet metal member in each intermediate region between the gate positions. However, according to the present invention, notches, holes, protrusions, or a combination thereof may be provided along the entire outer perimeter of the disk-shaped sheet metal member. Further, the notches or holes may be provided at interfaces between portions of the resin material forming the molded resin gear. Furthermore, the notches, holes, or protrusions may be provided at both sides of an interface between portions of the resin material forming the molded resin gear.

As described above, according to a sheet metal outsert-molded gear of the present invention, notches, holes, or protrusions are provided in the outer perimeter of a disk-shaped sheet metal member. With such an arrangement, even if a weld crack occurs, the gear pitch between gear teeth of a molded resin gear integrally formed with the disk-shaped sheet metal member is substantially maintained, and rotation of the sheet metal outsert-molded gear in association with an external gear is also maintained.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A sheet metal outsert-molded gear, in which a molded resin gear is formed by outsert-molding along the outer perimeter of a disk-shaped sheet metal, including:
   one or more pairs of notches, holes, or protrusions which extend through the disk-shaped sheet metal in a width direction and are provided in the outer perimeter of the disk-shaped sheet metal, and the outer perimeter of the disk-shaped sheet metal extends into the molded resin gear,
   wherein a weld is formed at positions between at least one of the one or more pairs of notches, holes or protrusions in the outer perimeter of the disk-shaped sheet metal and,
   a first spacing between the notches, holes or protrusions of the one or more pairs of notches, holes or protrusions at the weld is less than a second spacing between adjacent pairs of notches, holes or protrusions.

2. The sheet metal outsert molded-gear of claim 1, wherein the one or more pairs of notches, holes or protrusions are a plurality of pairs of notches, holes or protrusions.

3. The sheet metal outsert molded-gear of claim 1, wherein each pair of notches, holes or protrusions includes at least two notches, holes or protrusions.

\* \* \* \* \*